Aug. 3, 1954     A. L. HAYNES ET AL     2,685,211
POWER STEERING DEVICE

Filed March 4, 1953     2 Sheets-Sheet 1

A. L. HAYNES
W. A. VAN WICKLIN JR.
INVENTORS.

BY *E. C. McRae*
*J. R. Faulkner*
*D. H. Oster*

ATTORNEYS

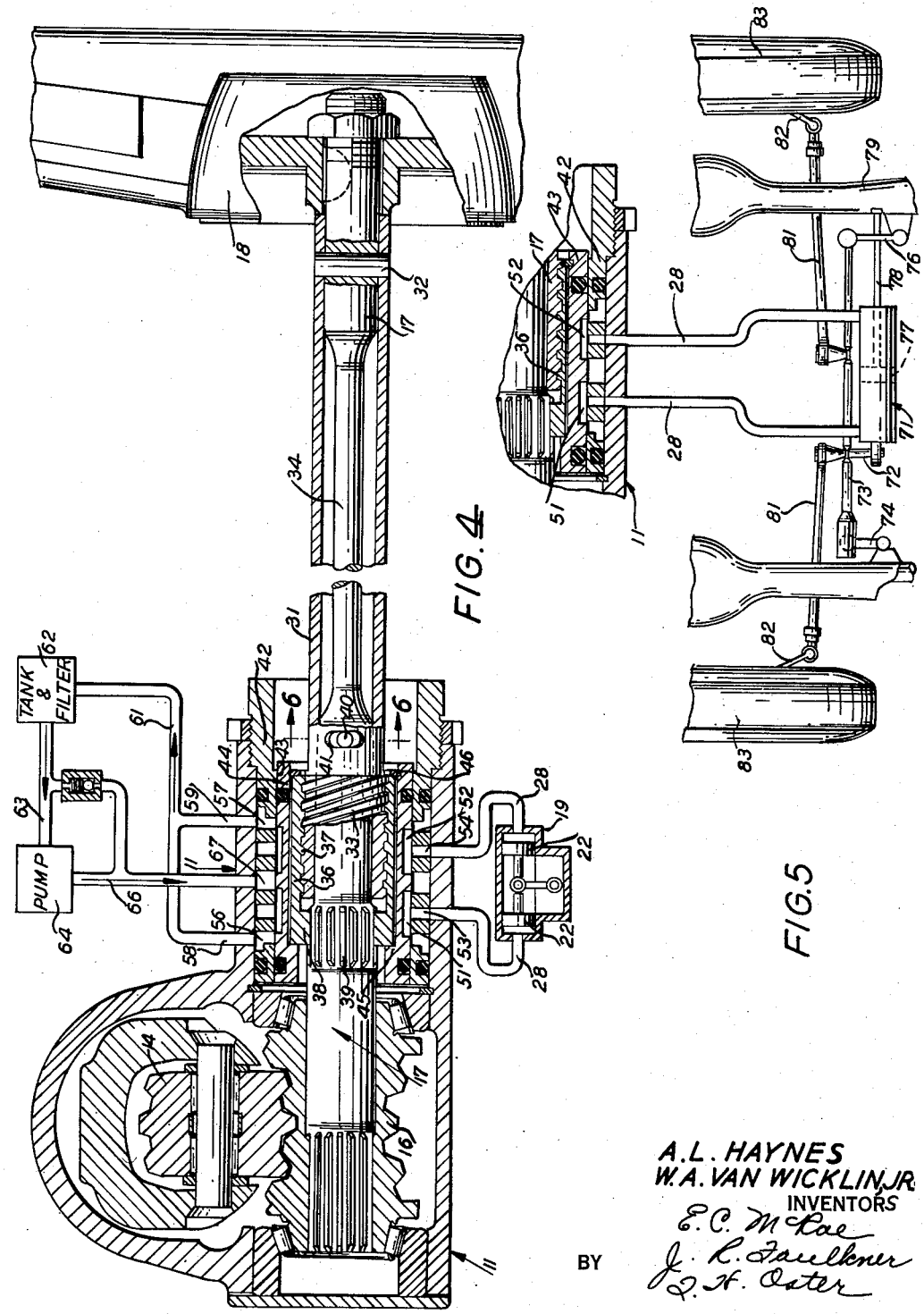

Patented Aug. 3, 1954

2,685,211

UNITED STATES PATENT OFFICE 2,685,211

POWER STEERING DEVICE

Alex L. Haynes, Detroit, and Warren A. Van Wicklin, Jr., Dearborn, Mich., assignors to Ford Motor Company, Dearborn, Mich., a corporation of Delaware Application March 4, 1953, Serial No. 340,306

4 Claims. (Cl. 74—388)

This invention relates generally to power steering mechanisms, and has particular reference to a steering mechanism in which the manual steering effort is augmented by a hydraulic power unit whenever the steering load exceeds a predetermined amount.

This application is a continuation in part of applicants' copending application Serial No. 282,784, filed April 17, 1952. In the said copending application a hydraulic valve spool is reciprocably mounted in the steering gear housing concentrically surrounding the steering post intermediate the ends of the latter. One end of the post is connected to the steering wheel while the opposite end carries a worm meshing with the worm wheel carried by the steering shaft. The steering post is reduced in diameter intermediate its ends so as to provide for torsional deflection under load. A non-deformable control sleeve surrounds the steering post, being secured to the post at its upper end adjacent the steering wheel, and being arranged for free rotation relative to the post adjacent its lower end. The steering post and control sleeve are formed with intersecting relatively inclined slots through which a pin extends with the protruding ends of the pin secured to the valve spool so that relative angular movement between the post and sleeve results in axial movement of the pin and the spool, controlling the flow of fluid to the opposite ends of the servo unit to furnish power to the steering mechanism when required. In the construction of the present application the general arrangement is the same as in the copending application, but the means for actuating the axial movement of the valve spool is different. Particularly, the inner end of the non-deformable control sleeve is formed with external threads of relatively large pitch, and an intermediate sleeve is located between the valve spool and the inner end of the non-deformable sleeve and is formed with internal threads engaging the external threads on the sleeve. This intermediate sleeve is keyed to the lower end of the steering post to compel rotation therewith as a unit while at the same time permitting axial movement along the post. In addition, the intermediate sleeve is connected to the valve spool so that axial movement of the intermediate sleeve causes a corresponding axial movement of the valve spool. Co-operating abutment means are provided between the steering post and the control sleeve to limit the relative angular movement therebetween. This mechanism provides a durable, long wearing, and efficient control unit in which the non-deformable control sleeve connected to the steering wheel directly actuates the valve spool against the reaction of the steering load as transmitted through the steering worm and the inner end of the steering post to the internally threaded intermediate sleeve. The resulting axial movement of the valve spool is accompanied by a torsional deflection in the reduced portion of the steering post and this imparts to the steering wheel a resistance or "feel" proportionate to the steering load. The construction is such, however, that the power steering mechanism would operate even if the torsionally deformable steering post were to break or fail completely.

Other objects and advantages of this invention will be made more apparent as this description proceeds, particularly when considered in connection with the accompanying drawings, in which:

Figure 4 is a longitudinal enlarged cross sectional view taken on the plane indicated by the line 4—4 of Figure 1, and in addition showing a portion of the steering wheel, and with the hydraulic circuit shown in diagrammatic form.

Figure 5 is a semidiagrammatical view, partly in section, showing the valve structure of Figure 4 in connection with a modified hydraulic servo unit connected to the steering linkage rather than to the steering gear shaft.

Figures 1, 2:
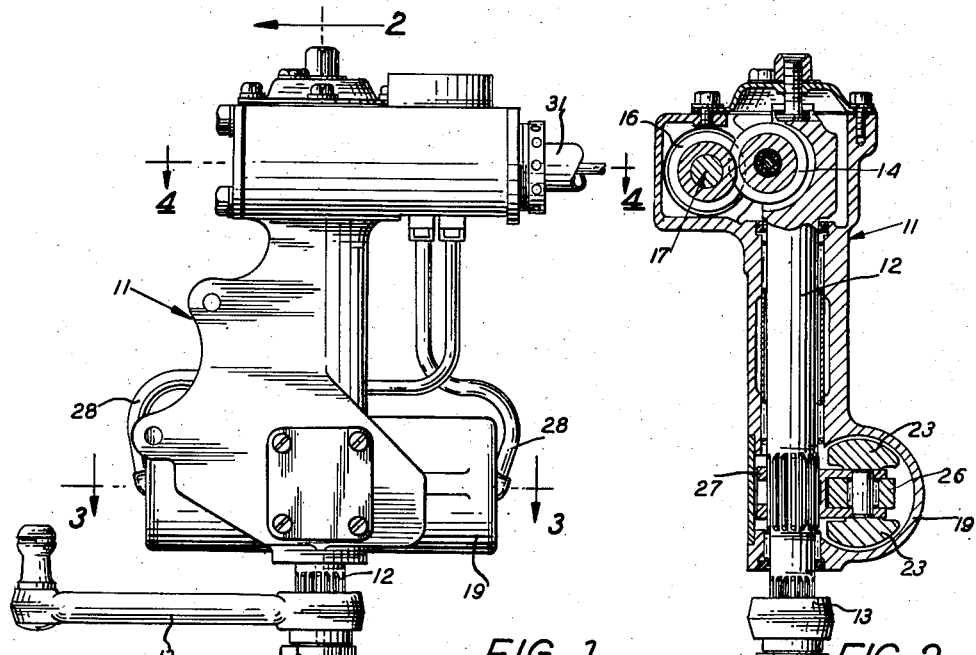
Figure 1 is a side elevational view of the power steering mechanism of the present invention.
Figure 2 is a vertical cross sectional view taken on the plane indicated by the line 2—2 of Figure 1.
Figure 3:
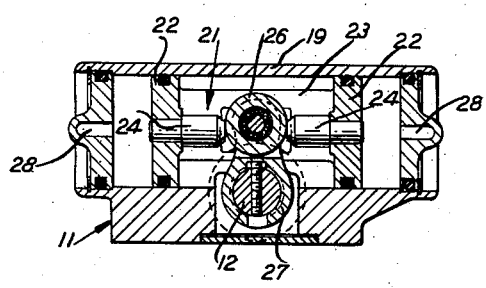
Figure 3 is a cross sectional view taken on the plane indicated by the line 3—3 of Figure 1.
Figure 6:
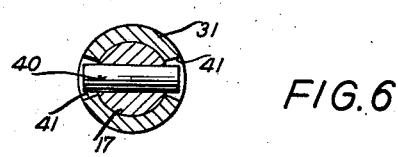
Figure 6 is a transverse cross sectional view taken on the plane indicated by the line 6—6 of Figure 4.

Referring now more particularly to the drawings, the reference character 11 indicates the housing of the steering mechanism of the present invention. Supported within the housing 11 is a generally vertical steering shaft 12 carrying a conventional pitman arm 13 at its lower end which in turn is connected by conventional linkage (not shown) to the steerable front wheels of a motor vehicle. At its upper end the steering shaft 12 rotatably supports a worm wheel 14 meshing with a worm 16 splined to the lower end of a steering post 17. At its upper end the steering post 17 is keyed to a conventional steering wheel 18.

The housing 11 is formed with an integral cylinder 19 extending generally at right angles to the steering shaft 12 adjacent the lower end of the latter. Reciprocably mounted within the cylinder 19 is a piston 21 having spaced heads 22 interconnected by means of axially extending struts 23. Pins 24 extend inwardly from the piston heads 22 and engage opposite sides of a roller 26 mounted upon the ends of a crank arm 27, the latter being splined to the steering shaft 12 intermediate the connections of the latter to the pitman arm 13 and the worm wheel 16. Conduits 28 extend from opposite ends of the cylinder 19 to permit fluid to be admitted and exhausted from opposite ends of the cylinder.

Concentrically surrounding the steering post 17 between the connections of the latter to the worm 16 and steering wheel 18 is a non-deformable control sleeve 31. The control sleeve 31 is connected to the upper end of the steering post 17 by means of a pin 32 so as to insure simultaneous rotation of the upper portions of the post and the sleeve. Adjacent its lower end the control sleeve 31 is formed with external square threads 33 of double pitch. The lower end of the sleeve 31 freely and rotatably embraces the adjacent portion of the steering post 17. It will be noted, however, that the intermediate portion 34 of the steering post 17 is reduced considerably in diameter so as to provide for torsional deflection thereof under load.

An intermediate sleeve 36 surrounds the lower end of the control sleeve 31 and is formed with internal square teeth 37 corresponding to and engaging the external teeth 33 of the control sleeve. At its lower end the intermediate sleeve 36 is formed with a flange 38 slidably axially engaging splines 39 formed upon the adjacent portion of the steering post 17 to permit relative axial movement therebetween but to insure rotative movement therewith as a unit.

It will be apparent from the foregoing that rotation of the non-deformable control sleeve 31 by the steering wheel 18 will result in axial movement of the intermediate sleeve 36 by reason of the engagement between the double pitch thread 33 and 37 on the control sleeve 31 and intermediate sleeve 36 respectively. During this axial movement of the intermediate sleeve 36 the intermediate reduced portion 34 of the steering post 17 torsionally deflects and transmits a reaction or "feel" to the driver through the steering wheel 18 proportionate to the amount of steering load encountered.

Relative angular movement between the steering post 17 and the control sleeve 31 is limited by means of a pin 40 carried by the steering post 17 and having its opposite ends received within elongated circumferentially extending slots 41 formed in the control sleeve 31. When the lost motion provided by this pin and slot connection is completely taken up in either direction the steering post and control sleeve rotate as a unit thus providing manual steering in the event of power failure.

A valve sleeve 42 is fixedly mounted within the housing 11 and is formed with a bore 43 receiving a reciprocable valve spool 44. The valve spool 44 is provided with a shoulder 45 at one end abutting the end flange 38 of the intermediate sleeve 36. A ring 46 engages the opposite end of the intermediate control sleeve 36 and insures axial movement of the valve spool and the intermediate sleeve as a unit.

In a manner similar to applicants' above mentioned copending application, the valve spool 44 is provided with annular peripheral grooves 51 and 52 arranged to selectively communicate with passages 53 and 54 communicating with the conduits 28 at the opposite ends of the servo cylinder 19.

Passages 56 and 57 formed in the valve sleeve 42 communicate with conduits 58 and 59 joined with each other in a common return conduit 61 leading into a reservoir tank and filter unit 62, the latter communicating by means of a conduit 63 with a pump 64. The output of the pump 64 is supplied through a supply conduit 66 to the central passage 67 of the valve sleeve 42.

In the neutral position of the valve spool 44 as shown in Figure 4, free circulation of fluid at low pressure through the system is permitted. Upon axial movement of the valve spool 44 in either direction due to turning of the steering wheel 18 against the steering load impressed upon the intermediate sleeve 38 high pressure fluid is directed from the supply conduit 66 to one end of the servo cylinder 19, while at the same time the opposite end of the cylinder is exhausted to the return conduit 63. Power assistance is thus applied to the steering gear shaft 12 by reason of the servo cylinder 19. Since the intermediate reduced portion 34 of the steering post 17 quite readily deflects torsionally under steering load a certain amount of reaction or "feel" is transmitted to the steering wheel 18 whenever there is relative rotation between the steering post 17 and the control sleeve 31, or in other words whenever the valve spool is shifted to supply power assistance to the steering mechanism. If the reduced portion 34 of the steering post were to break, hydraulic power steering would still be available since the control sleeve 31 would drive the intermediate sleeve 36 through the engaging threads 33 and 37 and against the resistance of the steering load in the intermediate sleeve 36.

Reference is now made to Figure 5 in which a booster type cylinder is used. The steering gear housing 11, shown here only in fragmentary form, and the valve construction and porting therein are identical with that shown in Figure 4. The conduits 28 leading therefrom, however, communicate with opposite ends of a booster type cylinder 71 mounted adjacent the steering linkage intermediate the side frame rails of the vehicle. One end of the cylinder 71 is connected at 72 to a drag link 73 extending transversely of the vehicle between the pitman arm 74 and an idler arm 76. A piston 77 within the cylinder is connected by a connecting rod 78 to the side frame member 79 of the vehicle. The drag link 73 is connected by means of tie rods 81 to steering arms 82 which in turn are secured to the steerable front wheels 83.

It will be understood that the invention is not to be limited to the exact construction shown and described, but that various changes and modifications may be made without departing from the spirit and scope of the invention, as defined in the appended claims.

What is claimed is:

1. In a power steering mechanism, a steering gear housing, a steering gear member rotatably mounted in said housing, a steering post having one end rotatably mounted in said housing and operatively connected to said member, said steering post projecting outwardly from said housing and having an intermediate portion reduced in cross section to allow torsional twisting of said steering post under load, a steering wheel secured to the outer end of said steering post, a hydraulic servo unit, a hydraulic power source, a hydraulic valve spool reciprocably mounted within said housing concentric with and surrounding said steering post and connected to the inner end of said steering post, means interconnecting said power source, valve spool and servo unit to enable said servo unit to be controlled by said valve spool, a sleeve between said valve spool and said steering post, said sleeve having a portion contained within said housing and a portion projecting outwardly from said housing, means connecting the outer end of the outwardly projecting portion of said sleeve to said steering post for rotation therewith as a unit, the inner end of said sleeve being mounted for rotative movement relative to said steering post, the inner end of said sleeve having external threads formed thereon and said valve spool having internal threads formed therein engaging the threads on said sleeve to move said valve spool axially upon relative rotation between the inner ends of said steering post and said sleeve.

2. The structure defined by claim 2 which is further characterized in that said valve spool is formed in two concentric parts, the outer section of said valve spool being reciprocably mounted within the steering gear housing, the inner section of said valve spool being keyed to the inner end of said steering post for rotation therewith as a unit while permitting axial movement along said post and means interconnecting said two valve spool sections to insure simultaneous reciprocation thereof as a unit.

3. The structure defined by claim 1 which is further characterized in that the inner ends of said steering post and said control sleeve have a lost motion connection therebetween permitting a limited relative rotation therebetween but insuring rotation of the post and sleeve as a unit after said predetermined angular relative movement.

4. In a power steering mechanism, a steering gear housing, a steering member rotatably mounted in said housing, steering linkage operatively connected to said steering gear member, a steering post having one end rotatably mounted in said housing and operatively connected to said member, a steering wheel secured to the opposite end of said steering post, a hydraulic power source, a hydraulic servo unit connected to said steering linkage to power actuate the latter, a hydraulic valve spool reciprocably mounted within said housing concentric with and surrounding said steering post, means interconnecting said power source, valve spool and servo unit to enable said servo unit to be controlled by said valve spool, a sleeve between said valve spool and said steering post, said sleeve having a portion contained within said housing and a portion projecting outwardly from said housing, means connecting the outer end of the outwardly projecting portion of said sleeve to said steering post for rotation therewith as a unit, the inner end of said sleeve being mounted for rotative movement relative to said steering post, and means associated with said steering post and said sleeve arranged to be moved axially upon relative rotation between said steering post and the inner end of said sleeve resulting from torsional movement of said steering post under steering loads, said last named means being connected to said valve spool to axially move the latter to actuate said servo unit.

No references cited.